United States Patent [19]
Longsworth et al.

[11] Patent Number: 5,687,574
[45] Date of Patent: Nov. 18, 1997

[54] THROTTLE CYCLE CRYOPUMPING SYSTEM FOR GROUP I GASES

[75] Inventors: Ralph C. Longsworth, Allentown; Francis T. Lotz, Whitehall, both of Pa.

[73] Assignee: APD Cryogenics, Inc., Allentown, Pa.

[21] Appl. No.: 615,131

[22] Filed: Mar. 14, 1996

[51] Int. Cl.⁶ .................. B01D 8/00; F25B 19/02
[52] U.S. Cl. .................. 62/55.5; 62/51.3; 417/901
[58] Field of Search .................. 62/51.2, 55.5; 417/901

[56] References Cited

U.S. PATENT DOCUMENTS

| | | | |
|---|---|---|---|
| 4,599,869 | 7/1986 | Ozin et al. | 62/55.5 |
| 4,606,201 | 8/1986 | Longsworth | 62/51.2 |
| 4,827,736 | 5/1989 | Miura et al. | 62/55.5 X |
| 5,231,840 | 8/1993 | Yagi et al. | 62/55.5 |
| 5,426,949 | 6/1995 | Saho et al. | 62/55.5 X |

FOREIGN PATENT DOCUMENTS

| | | | |
|---|---|---|---|
| 0047690 | 4/1981 | Japan | 417/901 |
| 0187781 | 9/1985 | Japan | 417/901 |

*Primary Examiner*—Christopher Kilner
*Attorney, Agent, or Firm*—Helfgott & Karas, P.C.

[57] ABSTRACT

A Group I gas cryopumping system includes a compressor throttle cycle refrigerator using mixed refrigerants. Cold refrigerant flows through a cryopumping surface located in a vacuum chamber, whereon vapor freezes. The refrigerant then passes through a heat exchanger in cross flow with refrigerant from the compressor. Refrigerant flow entering and leaving the heat exchanger is in uninsulated lines at substantially room temperature. All exposed cold lines are eliminated. The throttle device and cold cryopumping surface are an integral unit that connects directly to the flow paths of the heat exchanger without intermediate lines. The compressor/aftercooler unit may be located at any convenient distance from the heat exchanger and cryopumping surface, and the heat exchanger is located immediately adjacent to the pumping surface in a separate housing outside the vacuum chamber. The heat exchanger housing may share or be isolated from the vacuum of the vacuum chamber. Selected mixed refrigerants provide a wide range of cooling capacity over narrow, selectable temperature ranges. Thus, in a selected temperature range, gases are selectively collected to the exclusion of other gases. A tray collects liquid water from the cryopump surfaces during defrost.

18 Claims, 9 Drawing Sheets

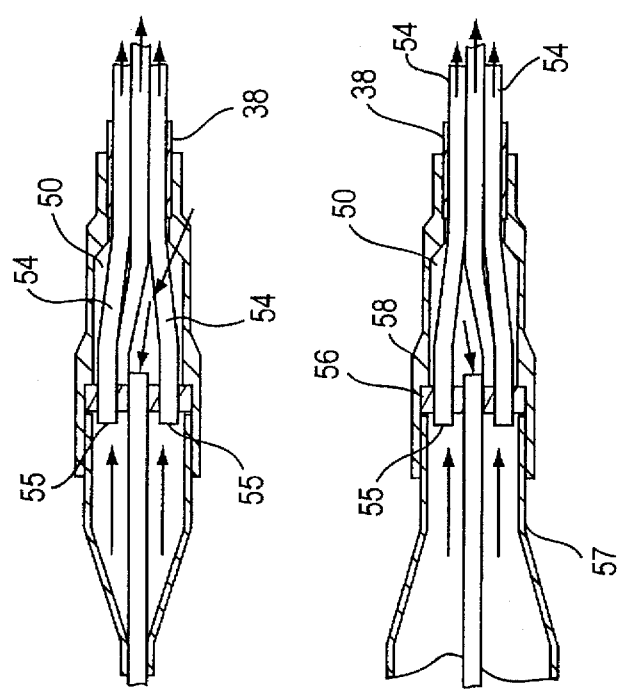
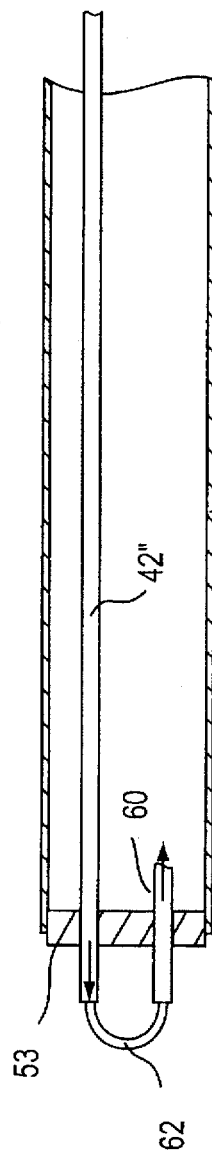
FIG. 4  FIG. 5  FIG. 6

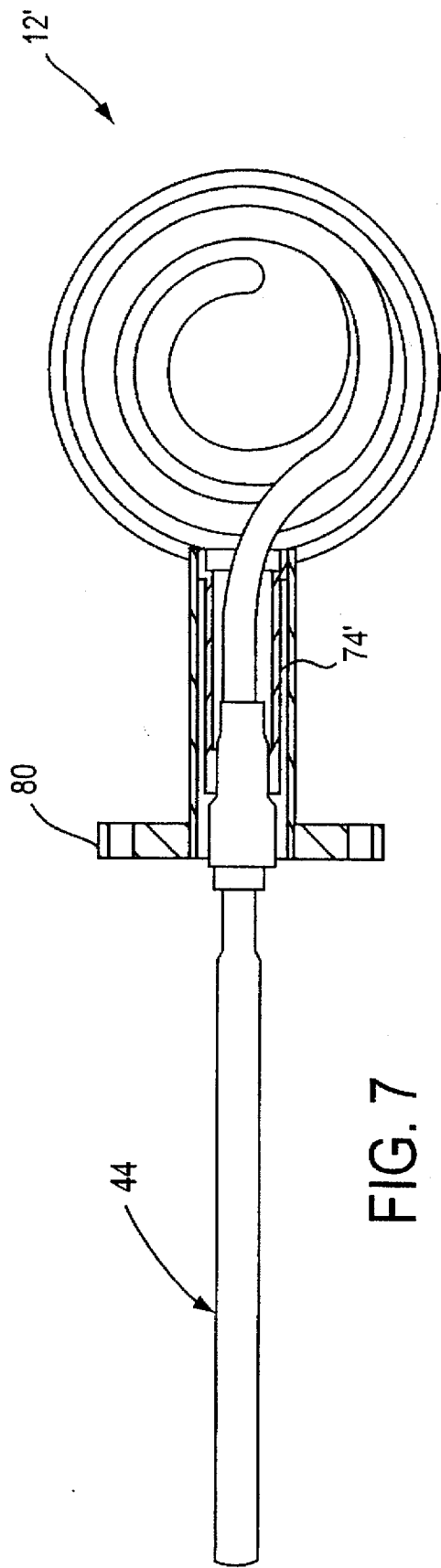
FIG. 7
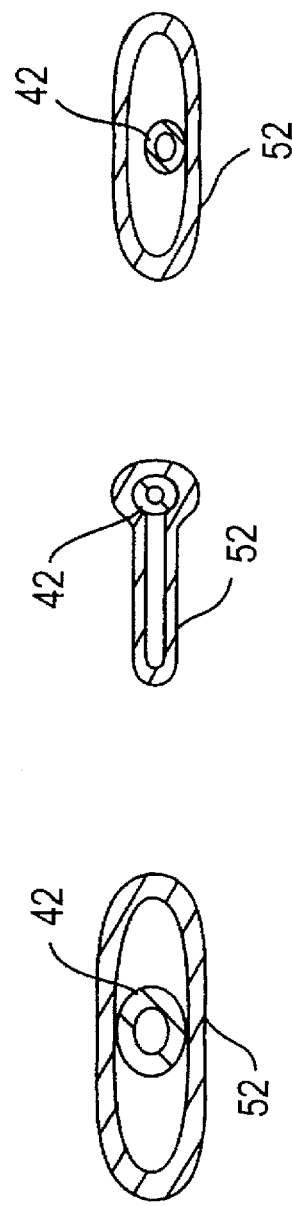
FIG. 13a
FIG. 13b
FIG. 13c

| | | | | | | | TEMPERATURES (°K) FOR VAPOR PRESSURE (torr) | | | | | | | | | | | |
|---|---|---|---|---|---|---|---|---|---|---|---|---|---|---|---|---|---|---|
| S | COMPOUND | DATA TEMP. RANGE °K | $10^{-13}$ | $10^{-12}$ | $10^{-11}$ | $10^{-10}$ | $10^{-9}$ | $10^{-8}$ | $10^{-7}$ | $10^{-6}$ | $10^{-5}$ | $10^{-4}$ | $10^{-3}$ | $10^{-2}$ | $10^{-1}$ | 1 | $10^{1}$ | $10^{2}$ | $10^{3}$ |
| He | HELIUM | 0.9-5.2 | | | | | | | | | | | | | | 1.268 | 1.738 | 2.634 | 4.518 |
| $H_2$ | HYDROGEN | 14-21 | 2.67 | 2.83 | 3.01 | 3.21 | 3.45 | 3.71 | 4.03 | 4.40 | 4.84 | 5.38 | 6.05 | 6.90 | 8.03 | 9.55 | 11.70 | 15.10 | 21.4 |
| Ne | NEON | 15-45 | 5.50 | 5.79 | 6.11 | 6.47 | 6.88 | 7.34 | 7.87 | 8.48 | 9.19 | 10.05 | 11.05 | 12.30 | 13.85 | 15.80 | 18.45 | 22.10 | 27.5 |
| $CH_4$ | METHANE | 48-112 | 24.0 | 25.3 | 26.7 | 28.2 | 30.0 | 32.0 | 34.2 | 36.9 | 39.9 | 43.5 | 47.7 | 52.9 | 59.2 | 67.3 | 77.7 | 91.7 | 115.0 |
| $F_2$ | FLUORINE | 54-89 | | | | | | | | | | | | | | (55.2) | 59.5 | 70.5 | 87.5 |
| $N_2$ | NITROGEN | 54-128 | 18.1 | 19.0 | 20.0 | 21.1 | 22.3 | 23.7 | 25.2 | 27.0 | 29.0 | 31.4 | 34.1 | 37.5 | 41.5 | 47.0 | 54.0 | 63.4 | 80.0 |
| CO | CARBON MONOXIDE | 56-133 | 20.5 | 21.5 | 22.6 | 23.8 | 25.2 | 26.7 | 28.4 | 30.3 | 32.5 | 35.0 | 38.0 | 41.5 | 45.8 | 51.1 | 57.9 | 67.3 | 84.1 |
| $O_2$ | OXYGEN | 57-154 | 21.8 | 22.8 | 24.0 | 25.2 | 26.6 | 28.2 | 29.9 | 31.9 | 34.1 | 36.7 | 39.8 | 43.3 | 48.1 | 54.1 | 62.7 | 74.5 | 92.8 |
| Kr | KRYPTON | 63-121 | 27.9 | 29.4 | 30.9 | 32.7 | 34.6 | 36.8 | 39.3 | 42.2 | 45.5 | 49.4 | 53.9 | 59.4 | 66.3 | 74.8 | 85.9 | 101.0 | 123.5 |
| NO | NITRIC OXIDE | 73-180 | 37.7 | 39.4 | 41.3 | 43.4 | 45.6 | 48.1 | 50.9 | 54.0 | 57.6 | 61.6 | 66.3 | 71.7 | 78.1 | 85.7 | 95.0 | 106.5 | 123.5 |
| Ar | ARGON | 82-88 | 20.3 | 21.3 | 22.5 | 23.7 | 25.2 | 26.8 | 28.6 | 30.6 | 33.1 | 35.9 | 39.2 | 43.2 | 48.2 | 54.4 | 62.5 | 73.4 | 89.9 |
| $N_2O$ | NITROUS OXIDE | 103-186 | 55.8 | 58.3 | 61.1 | 64.2 | 67.6 | 71.3 | 75.5 | 80.3 | 85.7 | 91.9 | 99.0 | 107.5 | 117.5 | 129.5 | 144.0 | 162.5 | 189.5 |
| $CO_2$ | CARBON DIOXIDE | 107-196 | 59.5 | 62.2 | 65.2 | 68.4 | 72.1 | 76.1 | 80.6 | 85.7 | 91.5 | 98.1 | 106.0 | 114.5 | 125.0 | 137.5 | 153.5 | 173.0 | 198.0 |
| Xe | XENON | 110-166 | 38.5 | 40.5 | 42.7 | 45.1 | 47.7 | 50.8 | 54.2 | 58.2 | 62.7 | 68.1 | 74.4 | 82.1 | 91.5 | 103.5 | 118.5 | 139.5 | 170.0 |
| HBr | HYDROGEN BROMIDE | 120-205 | 51.8 | 54.3 | 57.1 | 60.2 | 63.7 | 67.6 | 72.1 | 77.1 | 82.9 | 89.6 | 97.5 | 107.0 | 118.5 | 132.5 | 151.0 | 175.0 | 209.0 |
| HCl | HYDROGEN CHLORIDE | 132-195 | 49.7 | 52.1 | 54.6 | 57.5 | 60.6 | 64.1 | 68.1 | 72.5 | 77.6 | 83.4 | 90.1 | 98.1 | 108.5 | 121.0 | 137.0 | 158.5 | 193.0 |
| $NH_3$ | AMMONIA | 145-240 | 70.9 | 74.1 | 77.6 | 81.5 | 85.8 | 90.6 | 95.9 | 102.0 | 108.5 | 116.5 | 125.5 | 136.0 | 148.0 | 163.0 | 181.0 | 206.0 | 245.0 |
| $H_2S$ | HYDROGEN SULFIDE | 153-213 | 57.1 | 59.8 | 62.7 | 65.9 | 69.5 | 73.5 | 78.0 | 83.1 | 89.0 | 95.7 | 103.5 | 113.5 | 124.5 | 138.5 | 156.5 | 180.5 | 218.0 |
| COS | CARBONYL SULFIDE | 162-224 | | | | | | | | | | | | | (124.5) | 139.5 | 159.5 | 187.0 | 229.0 |
| $Cl_2$ | CHLORINE | 162-420 | 66.1 | 69.1 | 72.4 | 76.0 | 80.0 | 84.4 | 89.4 | 95.1 | 101.5 | 109.0 | 117.5 | 127.5 | 140.0 | 155.0 | 173.0 | 201.0 | 245.0 |
| $H_2O$ | WATER | 175-380 | 113.0 | 118.5 | 124.0 | 130.0 | 137.0 | 144.5 | 153.0 | 162.0 | 173.0 | 185.0 | 198.5 | 215.0 | 233.0 | 256.0 | 284.0 | 325.0 | 381.0 |
| $SO_2$ | SULFUR DIOXIDE | 178-263 | 78.9 | 82.4 | 86.3 | 90.4 | 95.1 | 100.0 | 106.0 | 112.5 | 119.5 | 128.0 | 137.5 | 148.5 | 161.5 | 177.0 | 195.5 | 225.0 | 269.0 |
| $CS_2$ | CARBON DISULFIDE | 194-319 | | | | | | | | | | | | | | 199.5 | 228.0 | 269.0 | 329.0 |
| HF | HYDROGEN FLUORIDE | 240-290 | | | | | | | | | | | | (160.0) | 177.5 | (179.0) | 207.0 | 245.0 | 301.0 |
| $Br_2$ | BROMINE | 253-331 | 102.0 | 106.5 | 111.0 | 116.5 | 122.0 | 128.5 | 135.5 | 143.5 | 152.5 | 163.0 | 174.5 | 188.5 | 204.0 | 224.0 | 248.0 | 282.0 | 339.0 |
| $I_2$ | IODINE | 298-456 | 141.5 | 147.5 | 154.0 | 161.5 | 169.5 | 178.5 | 188.5 | 199.5 | 212.0 | 226.0 | 243.0 | 262.0 | 285.0 | 312.0 | 345.0 | 389.0 | 471.0 |

FIG. 10

| DEFINE GROUP I GASES AS THOSE WITH A VAPOR PRESSURE OF 10^-6 TORR AT 80 TO 160K | | | | | | | |
|---|---|---|---|---|---|---|---|
| | | | TEMPERATURE - K | | | | |
| PRESSURE - TORR | 10^-10 | 10^-6 | 10^-4 | 10^-3 | 1 Atm | | |
| GROUP I GASES | | | | | | | |
| NH3 | 81.5 | 102.0 | 116.5 | 245.0 | 239.9 | | 2.94 |
| SO2 | 90.4 | 112.5 | 128.0 | 269.4 | 263.4 | | 2.91 |
| Br2 | 116.5 | 143.5 | 163.0 | 339.0 | 331.9 | | 2.85 |
| H2O | 130.0 | 162.0 | 185.0 | 381.0 | 373.0 | | 2.87 |
| I2 | 161.5 | 199.5 | 226.0 | 471.0 | 461.1 | | 2.86 |
| NON GROUP I | | | | | | | |
| CO2 | 68.4 | 85.7 | 98.1 | 198.0 | 193.8 | | 2.83 |
| N2O | 64.2 | 80.3 | 91.9 | 189.5 | 185.5 | | 2.89 |
| COMPOSITION OF DRY AIR | | | | PARTIAL PRESSURE - TORR | | | |
| | % | FRACTION | AT 1 ATM | AT 1 TORR | | | |
| N2 | 78.084000 | 7.81E-01 | 5.93E-02 | 7.81E-01 | | | |
| O2 | 20.947600 | 2.09E-01 | 1.59E-02 | 2.09E-01 | | | |
| Ar | 0.934000 | 9.34E-03 | 7.10E-00 | 9.34E-03 | | | |
| CO2 | 0.031400 | 3.14E-04 | 2.39E-01 | 3.14E-04 | | | |
| Ne | 0.001818 | 1.82E-05 | 1.38E-02 | 1.82E-05 | | | |
| He | 0.000524 | 5.24E-06 | 3.98E-03 | 5.24E-06 | | | |
| CH4 | 0.000200 | 2.00E-06 | 1.52E-03 | 2.00E-06 | | | |
| Kr | 0.000114 | 1.14E-06 | 8.66E-04 | 1.14E-06 | | | |
| H2 | 0.000050 | 5.00E-07 | 3.80E-04 | 5.00E-07 | | | |

FIG. 11

| MIXED REFRIGERANT COMPOSITIONS in MOL FRACTIONS | | | | |
|---|---|---|---|---|
| MIX # → | 2 | 1 | 4 | 3 |
| He | 4.0 | 8.9 | | 16.5 |
| N2 | | | | 26.8 |
| Ar | 20.4 | 19.3 | | 21.1 |
| CH4 | 25.2 | 27.8 | 32.7 | |
| C2H6 | 18.2 | 19.5 | 23.3 | 14.7 |
| C3H8 | 32.5 | 24.5 | 44.0 | 20.9 |
| C4H10 | | | | |
| TOTAL % | 100.0 | 100.0 | 100.0 | 100.0 |

FIG. 12

THROTTLE CYCLE CRYOPUMPING SYSTEM FOR GROUP I GASES

BACKGROUND OF THE INVENTION

This invention relates generally to a water vapor cryopump as used in a vacuum system, and more particularly, concerns a water vapor cryopumping surface that is part of a closed cycle single circuit refrigerator using mixed refrigerants and a throttle device.

Water vapor is generally pumped from a vacuum system either by circulating cold cryogenic fluid through a surface inside the vacuum chamber, or by cooling a cold trap in conjunction with a turbomolecular or a diffusion-type vacuum pump to increase the water vapor pumping speed.

Cryopumps, as exemplified in U.S. Pat. No. 4,150,549 by the inventor here, which patent is incorporated herein by reference, are unique in having high pumping speeds for all species of gases over a wide range of pressures. In a typical cryopump cooled by a two-stage Gifford-McMahon (GM) cycle refrigerator, Group I gases, including water vapor and carbon dioxide, as defined in U.S. Pat. No. 4,150,549, are cryocondensed on the first stage of the refrigerator. Group II gases, including nitrogen, oxygen and argon, are cryocondensed on the second stage. Group III gases, neon, hydrogen and helium are cryoadsorbed by an adsorbent on the seconds stage.

While water vapor is the most common gas that is pumped by a cryopump, which operates in the temperature range of 80K to 170K, there are numerous other gases that can be effectively pumped. Herein, gases are defined as Group I Gases if their equilibrium pressure is not less than $1 \times 10^{-1}$ Torr at a temperature in this range. Considering only the gases listed in the 1960 table (Table 1/FIG. 10) prepared by Honig and Hook, it is seen that $NH_3$, $SO_2$, $H_2O$ and $I_2$ fall in this category. These gases are listed in Table 2 (FIG. 11) with their vapor temperatures at $1 \times 10^{-1}$ Torr and 1 Atm.

The ratio of these two temperatures is listed in the last column on the right of Table 2 and is seen to be in the ratio of 2.84 to 2.94. Since all substances follow the same general saturation pressure/temperature relation, it can be inferred that any substance with a vapor temperature at 1 Atm in the range of about 232K (2.9×80) to 493K (2.9×170) will be a Group I Gas.

These gases when collected, are retained by the cryopump and necessitate periodic isolation of the cryopump from the vacuum chamber and warming of the cryopump to melt or desorb and remove the gases that have been pumped. Fortunately, cryopumps can retain a significant amount of gas that has been frozen so that the operating period between regeneration is long enough that the periodic need to regenerate the pump is not a significant disadvantage. However, it can be a disadvantage to accumulate and concentrate substantial quantities of toxic or hazardous gases, such as silane. This can occur with cryopumps.

A primary reason for choosing a turbomolecular pump, a dynamic device, instead of a cryopump, a static device, in a high vacuum application is to avoid such accumulation of hazardous gases. Turbomolecular and diffusion pumps are through-flow devices and therefore are usually preferred for high vacuum applications to avoid accumulation of hazardous gases. Turbomolecular and diffusion pumps are also sometimes preferred for their lower levels of vibration as compared to a typical cryopump. The turbomolecular and diffusion pumps, however, have relatively low pumping speed for water vapor.

Historically, before cryopumps and turbomolecular pumps were developed in the 1970s, it was standard practice to use a liquid nitrogen ($LN_2$) cooled cold trap in front of a diffusion pump to provide high pumping speed for water vapor, and to prevent backstreaming of oil from the diffusion pump. However, liquid nitrogen presents operational problems in keeping the cold trap filled with liquid nitrogen. Refrigerated cold traps have been built using single stage GM refrigerators with a diffusion pump. Because of cost, size and perhaps vibration, there has only been limited application of cold traps with single stage GM refrigerators.

Presently, the most widely used cold traps are cooled by closed cycle refrigerators using mixed refrigerants as described in U.S. Pat. Nos. 3,698,202, 3,768,273, 4,176,526, 4,535,597, 4,597,267, and 5,009,073.

The heat exchangers used to improve performance in these designs have phase separators to separate vapor from liquid. The separators make the devices relatively bulky and restricted to operation in fixed orientations. For these reasons, the heat exchanger assembly is located in the same enclosure with the compressor, and insulated lines carry cold refrigerant at low pressure from a heat exchanger cold end to the cold trap.

This arrangement permits the cold trap to be oriented in any position. However, the bulky lines, which must be relatively short to limit heat gain, limit the freedom of separating the compressor from the cold trap. Nevertheless, the thermal losses in the cold transfer lines make it impractical to build a low capacity system. The refrigerant gas mixtures and compressors, which have been used, result in minimum temperatures of about 120K being available, while typical operating temperatures are in the range of 140K to 160K. The basic concept for this cooling cycle was first described by A. P. Kleemenko, "One Flow Cascade System, Progress in Refrigeration Science", Pergamon Press (1960).

Another reason for using this type of closed-cycle refrigerator for a cold trap is that the cold refrigerant may be circulated through extended tubing inside a large vacuum chamber. This wide-area gathering capability is in contrast to the liquid drainage of a liquid nitrogen trap or the point source of cooling produced by a GM refrigerator.

What is needed is a closed cycle refrigerator cold trap for high vacuum chambers that eliminates the need for exposed, insulated cold refrigerant lines, and operates in any orientation with high efficiency and little vibration, if any. An ability to operate without adjustments to the refrigeration cycle, over a range of anticipated thermal loads in a selected temperature range of about 20K between desired temperatures, is needed.

SUMMARY OF THE INVENTION

A water vapor cryopumping system in accordance with the invention includes a throttle cycle refrigerator using mixed refrigerants. The refrigerator includes a compressor discharging a mixed refrigerant at high pressure to an aftercooler where heat is rejected to ambient and then to a heat exchanger wherein the refrigerant is further cooled to a cryogenic level. The cooled refrigerant next flows through a fixed throttle device or restrictor, e.g., a capillary tube, whereby its pressure and temperature drop in accordance with known Joule-Thomson effects. The cold refrigerant flows through a cryopumping surface located in a vacuum chamber, wherein water vapor, which impinges on the cold surface, freezes. The refrigerant, now partially evaporated, leaves the cold surface and flows back through the heat exchanger to thereby cool the refrigerant entering the restrictor after flowing from the high pressure side of the compressor and aftercooler. The refrigerant flow entering and leaving the heat exchanger is at substantially room temperature. The refrigerant leaving the heat exchanger returns to the low pressure inlet to the compressor where the refrigerant is compressed and the circular flow of refrigerant is repeated.

In a preferred embodiment, the throttle device and cold cryopumping surface are an integral unit that connects directly to the flow paths of the heat exchanger without intermediate lines.

Because the lines entering and leaving the heat exchanger are substantially at room temperature, there is no need to insulate these lines, and the compressor may be located at any convenient distance from the heat exchanger and cryopumping surface. Vibrations at the vacuum chamber are reduced.

The cryopumping surface is located within the vacuum chamber where water vapor is being pumped and the heat exchanger is located in a separate housing outside the vacuum chamber but immediately adjacent to the cryopumping surface. The housing of the heat exchanger may share the vacuum of the vacuum chamber, or the heat exchanger may be isolated in its housing at an independently controlled pressure. By locating the heat exchanger immediately adjacent to the cryopumping surface, all exposed cold lines may be eliminated from the construction. Thermodynamic efficiency is enhanced.

By using selected mixed refrigerants in the closed cycle refrigerator system, a wide range of cooling capacity is made available over a narrow, selectable temperature range. Thus, in a selected narrow temperature range, gases are selectively collected at the cryopumping surface to the exclusion of other gases. A tray may be associated with the cryopumping surface which automatically collects liquid water dripping from the cryopump surfaces during a defrost operation.

Accordingly, it is an object of this invention to provide an improved throttle cycle water vapor cryopumping system having refrigerant lines extending at substantially room temperature between a remote compressor/aftercooler unit and a cold trap operating in a vacuum chamber.

Yet another object of the invention is to provide an improved throttle cycle water vapor cryopumping system wherein a counterflow single circuit heat exchanger outside of a vacuum chamber is positioned immediately adjacent to the cryopumping surface located in the chamber to form an integral unit.

Still another object of the invention is to provide an improved throttle cycle water vapor cryopumping system wherein a mixed refrigerant is selected for operation in a closed refrigeration cycle in a narrow cryogenic temperature range of the cryopumping surface over an extended range of cooling capacity.

A further object of the invention is to provide an improved throttle cycle water vapor cryopumping system that operates without adjustment to the refrigerant flow control restrictor device over an extended capacity.

Other objects, features and advantages of the invention will in part be obvious and will in part be apparent from the specification.

This invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is an enlarged elevational view, in section, of a cryopumping surface used in the embodiment of FIGS. 2 and 3;

FIG. 5 is a top view of the cryopumping surface of FIG. 4;

FIG. 6 is a fragmented view similar to FIG. 5 of an alternative embodiment of a cryopumping surface in accordance with the invention;

FIG. 7 is a view similar to FIG. 3 of an alternative embodiment of a cryopumping surface in accordance with the invention;

FIGS. 10 and 11 are tables of properties of common gases and air;

FIG. 12 is a table of refrigerant mixtures for use in a system of the present invention; and FIGS. 13a–c are alternative constructions of a cold surface in accordance with the invention.

DETAILED DESCRIPTION OF PREFERRED EMBODIMENTS

At the outset, it must be noted that the following text describes the invention principally citing water vapor as the pumped gas. Water vapor is an example selected because it is frequently the major component being pumped from a vacuum chamber at cryogenic temperatures. The invention is not limited to water vapor pumping but is intended to include systems for pumping all of the gases in Group I, as described and referenced above.

Figure 1:
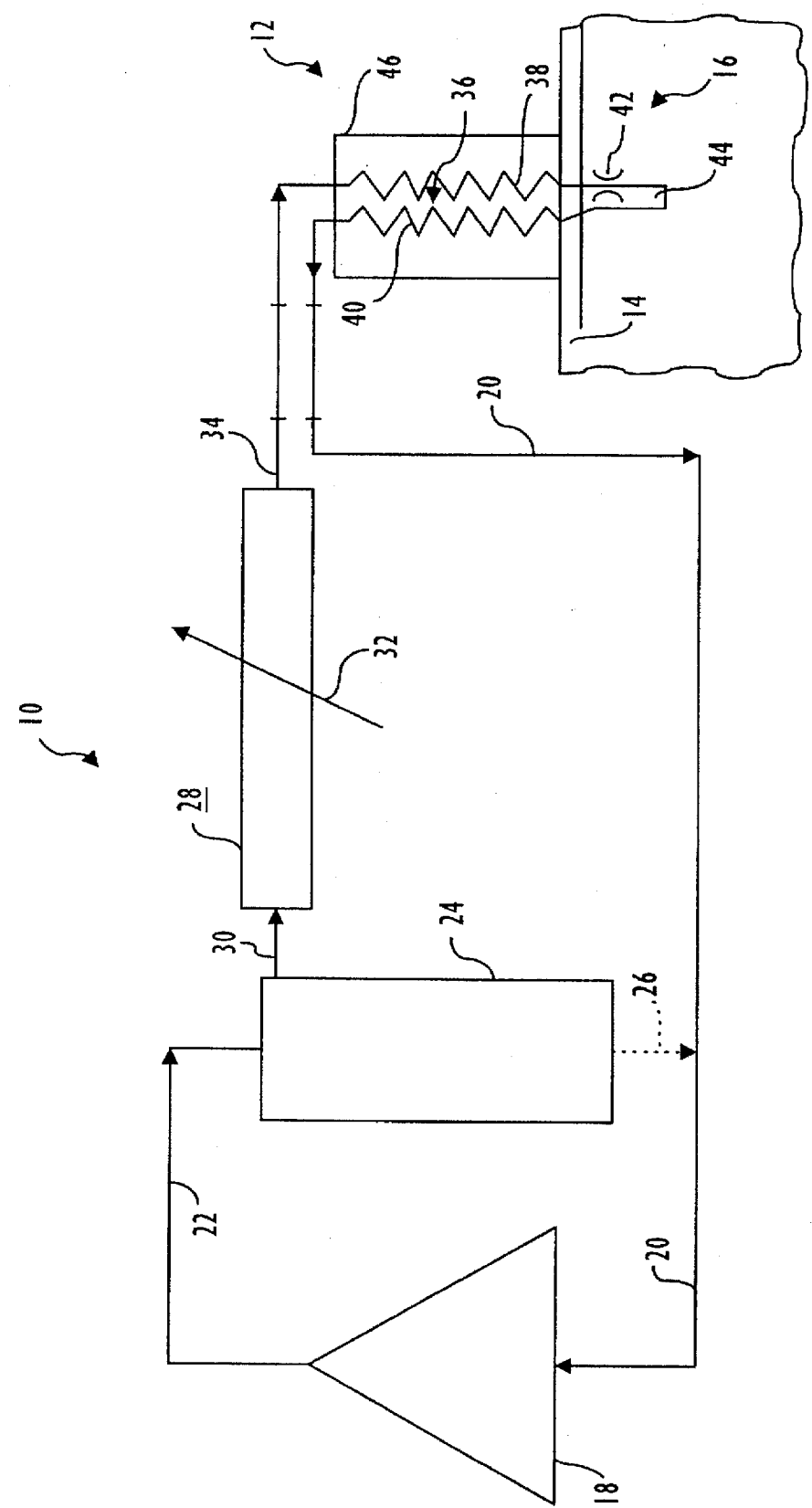
FIG. 1 is a schematic diagram of a throttle cycle water vapor cryopumping system in accordance with the invention.

FIG. 1 is a functional schematic illustrating a refrigeration system 10 having a cold trap 12 in accordance with the invention. The refrigeration system 10 includes a compressor 18, represented by a triangular block, which receives a flow of a refrigerant of mixed gases and entrained lubricating oil from a low pressure line 20 and discharges compressed refrigerant gas and entrained oil into a high pressure line 22. An oil separator 24, represented by a rectangular block, which may be a simple gas-liquid filter, is connected to receive the compressed gas mixture and entrained oil from the line 22 and functions to separate oil from the gas. The separated oil is delivered back to the compressor 18 at its low pressure inlet after flow through a restriction 26, e.g., a capillary tube, and then returns to the compressor 18 by way of the line 20.

The high pressure gas, with the oil removed, flows to an aftercooler 28 through the high pressure line 30. The aftercooler 28 may be air or water cooled as schematically indicated by the transverse arrow 32, and functions to remove heat of compression and heat absorbed by the cold trap 12. High temperature components in a refrigerant mixture may condense fully or partially in the aftercooler 28 dependent upon the gas mixture that is circulating.

For purposes of the following description, it will be assumed that the aftercooler 28 is air cooled and refrigerant leaves the aftercooler 28 through the line 34 at or near ambient temperature. If the refrigerant mixtures that are to be used in the system always provide an output from the aftercooler 28 to the line 34, which is free of condensed refrigerant, the oil separator 24 can be located at the outlet of the aftercooler.

The partially cooled refrigerant mixture from the aftercooler 28 flows to a counter flow heat exchanger 36 that has a high pressure flow path 38 and a low pressure flow path 40 with a heat exchange relationship therebetween. The high pressure refrigerant mixture flows from the aftercooler 28 through the high pressure flow path 38 where the mixture is further cooled in the heat exchanger 36 such that it becomes mostly liquid before passing through a flow restrictor 42, e.g., a capillary tube.

Thereby, the pressure of the refrigerant is reduced and the low temperature component of the refrigerant mixture starts to boil. The cold, low pressure refrigerant next flows through a cryopumping surface 44, as described in greater detail hereinafter, and flows back as a two phase mixture of approximately 85% liquid, to the low pressure inlet of the heat exchanger 36, then to the compressor 18 by way of the low pressure path 40 in the heat exchanger 36 and return line 20.

In the heat exchanger 36, the refrigerant, in two phases, i.e., partially liquid and partially gas, cools the high pressure refrigerant approaching the flow restrictor 42 in the high pressure flow path 38. Sufficient surface area is provided in the heat exchanger 36 such that the refrigerant that enters the low pressure line 20 is at or near ambient temperature. Thus, the lines 20 and 34, which connect to the heat exchanger, require no insulation.

Molecules of water that approach the inlet to the cryopump 16 and contact the cold cryopumping surfaces 44 are frozen, whereby water vapor is removed from the low density atmosphere that remains within the vacuum chamber 14.

The refrigeration system 10 uses a single stage compressor 18 and the heat exchanger 36 has a single circuit counterflow arrangement.

Different basic types of single stage refrigerant compressors may be used in the system in accordance with the invention, e.g., of the rotary or reciprocating type. The throttle device 42 may be a capillary tube, as stated, or a throttle valve, which is manually or automatically operated. Details of a compressor system that may be applied in the present invention are provided in U.S. Pat. No. 5,337,572, issued Aug. 16, 1994, to the inventor here. This patent is hereby incorporated by reference. More details of cryogenic refrigeration systems and flow arrangements are presented in the pending U.S. patent application Ser. No. 08/499,257, filed Jul. 7, 1995, and owned by the assignee of this application.

Because the heat exchanger 36 has temperatures ranging from ambient at the inlet and outlet to cryogenic temperatures where the heat exchanger connects to the cold pumping element or cryopumping surfaces 44, the heat exchanger is surrounded by a housing 46 to reduce heat gain by the heat exchanger 36 from the surrounding environment.

Figure 2:
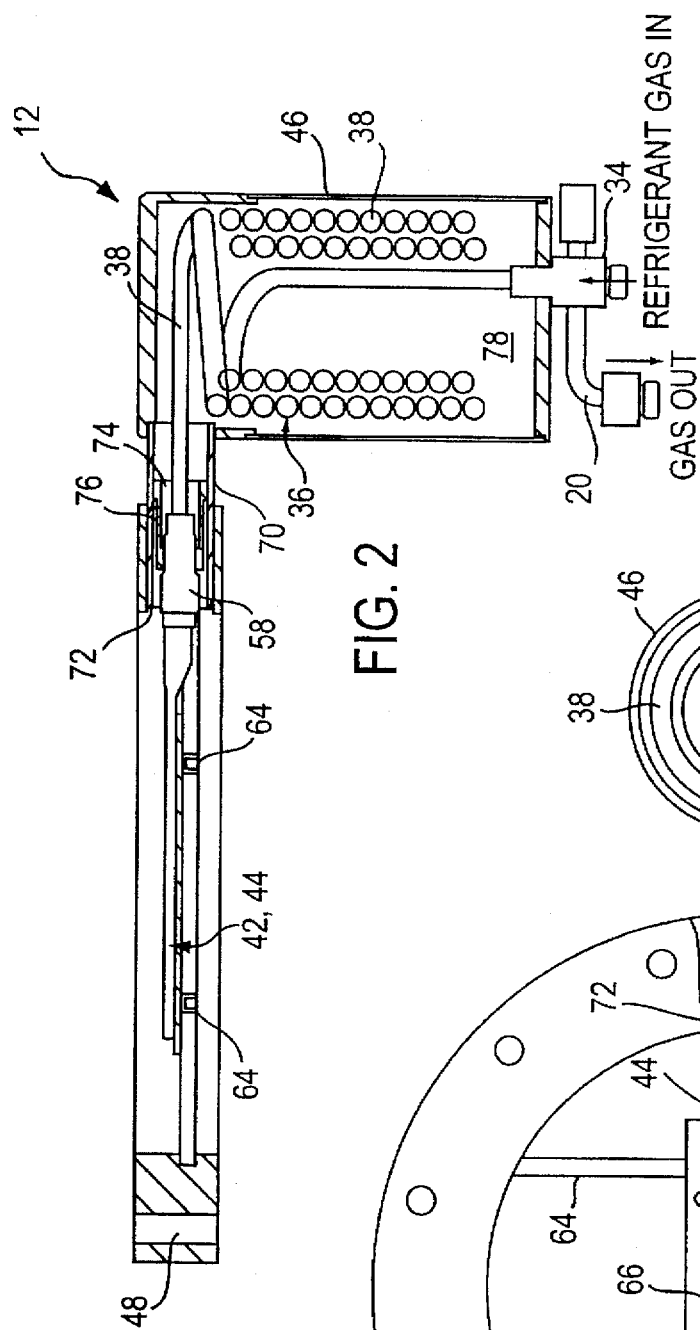
FIG. 2 is an elevational view in section of a cold trap in accordance with the invention.
Figure 3:
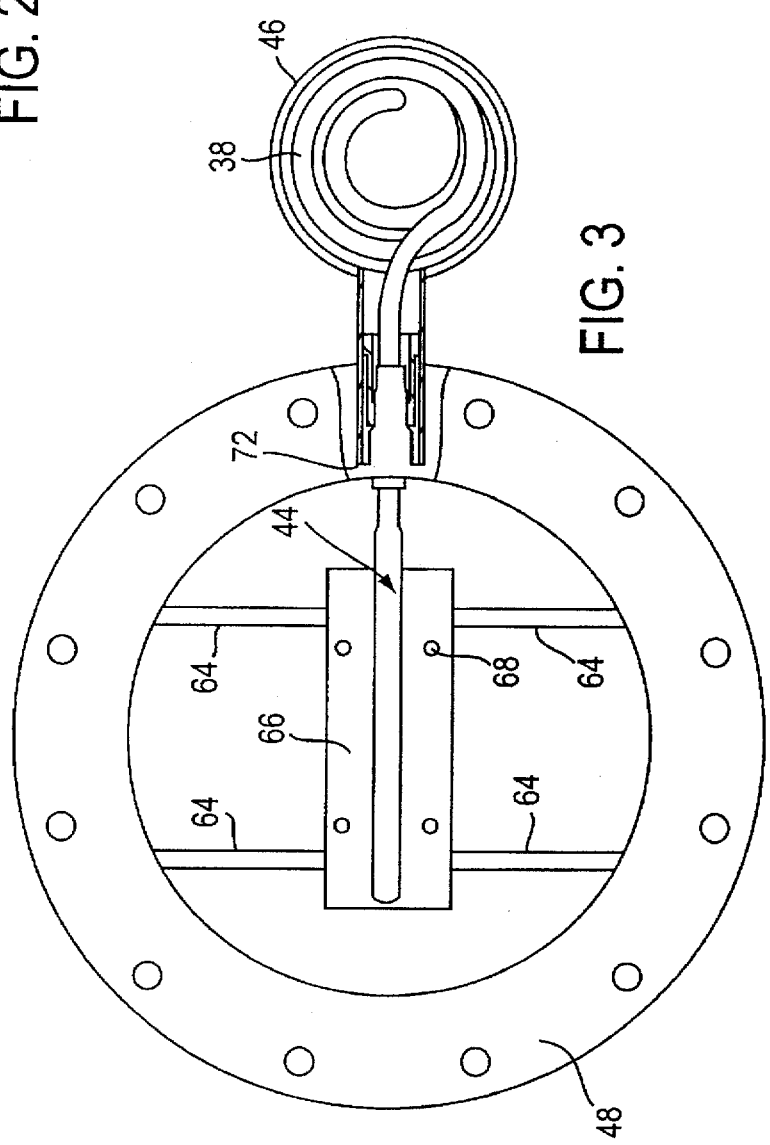
FIG. 3 is a top view of the cold trap of FIG. 2.

FIGS. 2 and 3 illustrate a cold trap 12 of the present invention that is fitted on a flange 48 which may be attached to the inlet flange of a turbomolecular pump or a diffusion pump (not shown). Because the refrigerant lines 20, 34 (FIGS. 1 and 2) are at or near room temperature and accordingly have little heat exchange with the ambient, the compressor 18 can be separated (from a heat transfer perspective) by any distance from the cold trap unit 12. Self-sealing components (not shown) join the lines 20, 34 to the cold trap 12 and compressor 18. The heat exchanger 36, in its housing 46, is located immediately adjacent to the flange 48 through which flows the gas being pumped from the vacuum chamber 14 (FIG. 1). The cold pumping surface, i.e., the cryopumping surface 44, is located in or at the entrance to the chamber 14.

The high pressure flow path 38 of the heat exchanger 36 comprises two continuous and concentric coils of hollow tubing that open into a small plenum 50 (FIGS. 4–5). Refrigerant in the plenum 50 then enters a capillary tube 42' that provides the throttling function indicated at 42 in FIG. 1.

The capillary tube 42' extends within a flattened tube 52, which prior to being flattened was of larger diameter than the capillary tube. The outer tube 52 is flattened an amount that provides good heat transfer in the leaving flow channels on both sides of the capillary, as illustrated in FIG. 5. Refrigerant, now at lower pressure, leaving the open end 43 of the capillary tube 42', reverses its direction and returns the full flattened length of the tube 52 before entering a plurality of tubes 54 having open ends 55 that communicate with the low pressure refrigerant flow. The tubes 54 are located inside the flow path 38 and discharge into the low pressure flow path 40 of the heat exchanger 36.

The capillary tube 42' and the ends 55 of the multiple tubes 54 are supported in a tube sheet 56 that closes the rounded end 57 of the otherwise flattened tube 52, whereby the flow of cold refrigerant from the plenum 50 into the capillary tube 42' is isolated from the return flow of cold refrigerant that enters the multiple tubes 54. A reducing fitting 58 connects between the rounded end 57 of the tubing 52 and the high pressure flow path tubing 38 so as to define the small plenum 50 and make an integral connection between the capillary 42', cold end 44 and the heat exchanger 36.

It will be understood that the multiple tubes 54, which taken together correspond to the flow path 40 of FIG. 1, do not entirely fill the high pressure flow path tube 38 in the heat exchanger 36 such that there is active flow of refrigerant both inside and outside of the multiple tubes 54 to provide an efficient counterflow heat exchanger 36 as indicated schematically in FIG. 1. It should also be understood that the invention is not limited to a tube-in-tube heat exchanger so long as an adequate heat exchanger relationship is maintained between the flow paths 38, 40.

The length and internal diameter of the capillary tube 42' is determined to meet the flow and pressure requirements for the selected refrigerant mixture. As illustrated in FIGS. 4 and 5, adjustment to the capillary tube is only possible by disassembly of a leak tight construction. FIG. 6 illustrates an alternative embodiment of a cryopump cold end 44' wherein the capillary tube 42" extends beyond the end plug 53 of the flattened tube 52. Refrigerant flow re-enters the cold end 44' through a secondary tube 60 that connects to the capillary tube 42" by way of an intermediate capillary tube 62. The length and internal diameter of the intermediate capillary tube 62 may be selected and readily changed, with suitable brazing or soldering at the joints, so that the throttling capability of the system can be variably selected or "tuned" to meet desired performance characteristics with a particular refrigerant. The secondary tube 60 may also be a capillary tube by inside dimension, but this is not a necessity. The resultant performance as a throttle device depends upon the three elements 42", 62, 60 when the tube 60 is also a capillary tube.

The tube 54 within-a-tube 38 construction terminates in the cold trap 12 and low pressure gas and liquid, isolated from the high pressure path, leave the cold trap 12 through the low pressure line 20 leading to the compressor 18.

As illustrated in FIGS. 2 and 3, the cold end cryopumping surface 44 is supported in the opening of the circular inlet flange 48 of the pump 16 by structural members 64 that have low thermal conductivity. The cold end 44 is mounted onto a thermally conductive plate 66 having holes 68 so that additional surfaces can be bolted thereto for increased area on which water vapor can be frozen out.

As best illustrated in FIG. 2, the housing 46 is connected to the flange 48 by a tubing 70 that fits within a radial opening 72 in the flange 48. The reducing fitting 58, and thereby the entire cryopump cold end 44, is supported by a bushing 74 that fits within the tubing 70 and around a portion of the reducing fitting 58 to make a leak tight connection between the housing 46 and the flange 48.

Holes 76 through the bushing 74 connect the internal vacuum of the chamber 14 to the interior space 78 of the heat exchanger housing 46. The axial length of the bushing 74 is determined in consideration of the temperature gradient between the vacuum chamber and the end of the tubing. 38 (with the inner tubes 54) that is adjacent to the mounting flange 48 of a pump inlet. A material with low out-gassing properties in a vacuum, such as stainless steel, is suitable for the bushing 74.

Other variations of throttle devices 42 of the orifice or valve type, and other flow arrangements are described in the patent application mentioned above.

Figure 8:
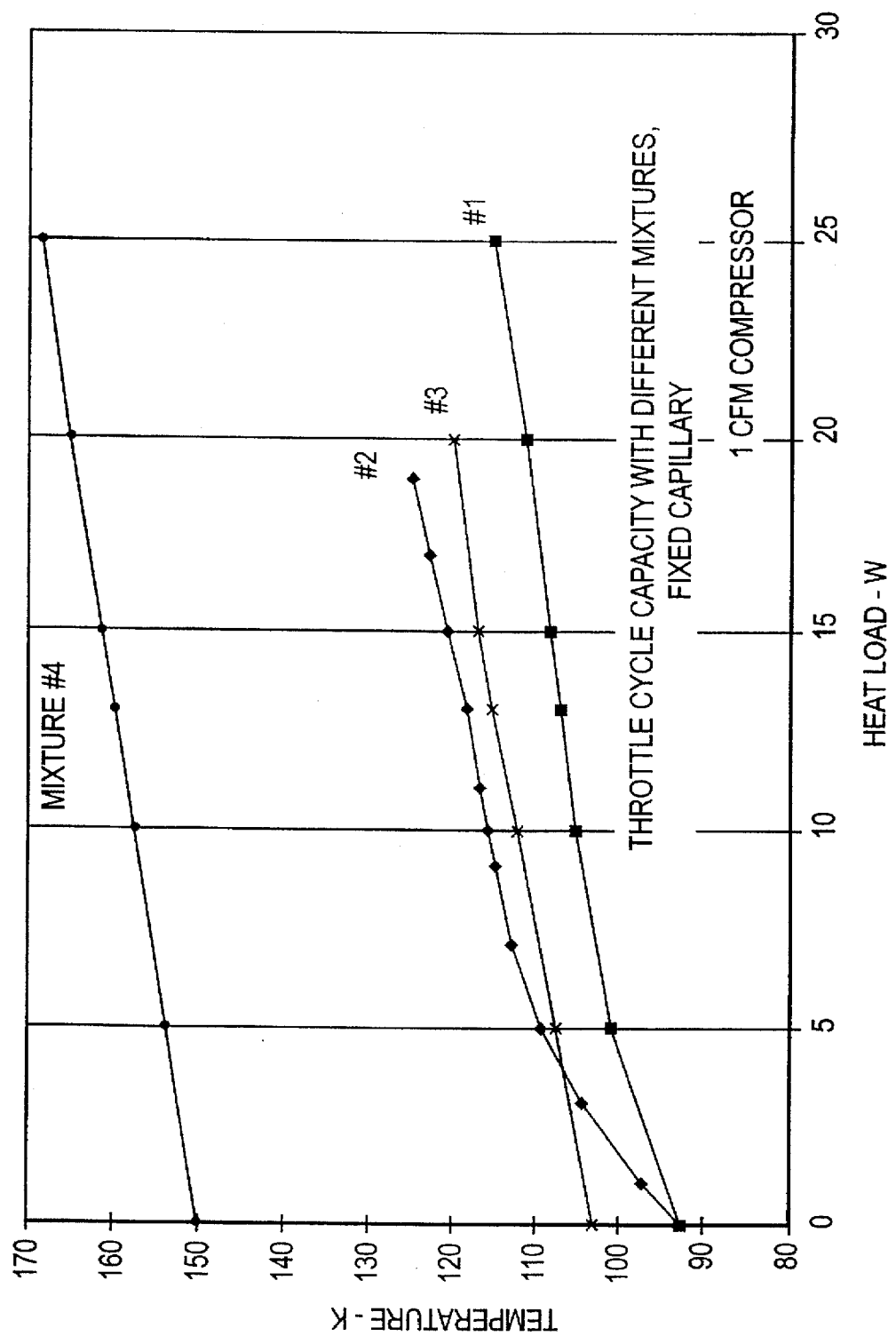
FIG. 8 illustrates performance characteristics of a throttle cycle water vapor cryopumping system in accordance with the invention, operating without adjustable controls.

An alternative embodiment (FIG. 7) of a cold trap 12' in accordance with the invention is similar to the cold trap 12 of FIGS. 2–5 except that the cryopumping cold end surface 44 is connected to a general purpose mounting flange 80. Thereby, the device 12' can be installed in any vacuum chamber or channel and is not particularly related to the inlet of a turbomolecular or diffusion pump as in the earlier described and illustrated embodiment. Extensions to the cold end 44 in the form of fins or plates are not illustrated in FIG. 7 but such adaptations may be made to extend the water vapor freezing surfaces. Additionally, the bushing 74' is without openings or holes 76 therethrough such that a vacuum may be maintained within the heat exchanger housing 46 that is entirely separate from the vacuum in the chamber wherein the cryopumping cold end surface 44 is located. Thus, the cold trap 12' of FIGS. 7, 8 is adaptable for many installations.

When the heat exchanger 36 is not isolated in a separate vacuum, the heat exchanger surfaces of the tubings 38, 40, which are at temperatures between room temperature (ambient) and the cold temperature of the cryopumping surface 44, might serve as a delay in pumping impulses of gas. The gas might freeze at an intermediate temperature on the heat exchanger 36 and then may be released over a long period of time. For example, water has a vapor pressure of $1 \times 10^{-11}$ torr at 124K. This means that at a pressure of $1 \times 10^{-11}$ torr the rate of water molecules hitting a cold surface and sticking there equals the rate of water molecules subliming from the same surface. If the pressure of water vapor surrounding the cold panel is greater than $1 \times 10^{-11}$ torr, then the rate at which water freezes on the surface exceeds the rate at which water sublimes, in proportion to the pressures.

If water vapor should enter the region around the heat exchanger 36 at an elevated pressure for a short period of time, the water may freeze at a higher temperature (than exists at the cold end 44) on the heat exchanger 36. Then, when the high vapor pressure of water diminishes, the pressure in the vacuum chamber does not return to an initial low pressure immediately, because water is now subliming from the higher temperature surface on the heat exchanger 36.

The same delay can happen with other gas species, e.g., $CO_2$, that are present in the vacuum chamber while pumping water vapor. For this reason, there is an advantage to maintain the cold cryopumping surface 44 within a specific narrow range of temperature and to isolate the heat exchanger.

The Vapor Pressure Curves of Honig and Hook, RCA Review 21,360 (1960) provides data for many common gases (FIG. 10). Water is an example of a Group I Gas that desirably is trapped at a pressure of $<1 \times 10^{-10}$ Torr while not trapping $CO_2$ at a pressure greater than about $1 \times 10^{-4}$ Torr. A cryopanel temperature of <130K is needed to hold water at $<1 \times 10^{-10}$ Torr and a cryopanel temperature >98K is needed to avoid retaining $C_2$ at a pressure greater than $1 \times 10^{-4}$ Torr. It is possible to select a refrigerant mixture and operating pressures such that the cryopanel temperature, with no heat load on it, is greater than 98K and with a maximum heat load is less than 130K.

FIG. 8 shows test results for several different mixtures and demonstrates that Mixture #3 spans the temperature range from 103K at no load, to 120K under maximum load. From a practical standpoint, Mixtures #1 and #2 would also be useful because a 200 mm absorber cold trap typically has a minimum heat load of about 5 watts, which means that the cryopanel temperature would be above 100K and $CO_2$ would not collect.

This example illustrates a problem associated with using a turbo-molecular pump (TMP) to pump air from a vacuum chamber. As listed in FIG. 11, air includes 0.0314% $CO_2$. In an evacuation procedure, it is typical to reduce the pressure in a vacuum chamber from 1 atmosphere (760 Torr) to <0.3 Torr using a roughing pump before opening a gate valve to the cold trap and TMP to take the pressure lower. At a total pressure of 0.3 Torr, the partial pressure of $CO_2$ is $1 \times 10^{-4}$ Torr. If the cryopanel temperature is slightly below 98K, the panel can freeze out $CO_2$ at about $1 \times 10^{-4}$ Torr when the valve is first opened. After the chamber pressure has dropped much below the initial 0.3 Torr, the $CO_2$ that froze on the cryopanel will slowly evaporate and prevent the chamber from reaching minimum pressure until all of the $CO_2$ has sublimed. This time delay in pumping a gas that freezes on a cropanel at high pressure and is then sublimed at a lower pressure is referred to in the art as "clamping".

The problem is typically avoided in cold traps that are cooled by GM refrigerators by adding a temperature sensor, heater and temperature controller to keep the cold trap temperature above 100K. An advantage of selecting a refrigerant mixture, such as mixture #3, that has an operating temperature range in between 98K and 130K for the present example, is that the cost of a temperature controller is avoided.

While water and $CO_2$ are the most common gases where one gas must be pumped while excluding the other, there may be other combinations for which this principal applies. Mixture #4, for example, can be used to pump $I_2$ at $<10^{-10}$ Torr and not pump $SO_2$ at a pressure $<10^{-4}$.

20K has been found as a desirable temperature range for a refrigerant mixture between no load and maximum load, but for some combination of gases the range may be greater. An essential feature is to select a mixture such that the desired gases are pumped/not pumped without using a temperature controller.

The compositions of mixtures #1–#4 are listed in Table 3 (FIG. 12).

Therefore, it is desirable to select refrigerant gas mixtures in the closed refrigeration cycle, and operating pressures, that provide cold plate temperatures within specific narrow temperature ranges. For example, selected ranges, each with a span of about 20K, can be provided between 80K and 160K. As stated, FIG. 8 shows measured temperature at the cold surface 44 versus heat load for tests with refrigerant mixtures that were designed for use in a cold trap.

The operating temperature was adjustable during testing within a limited range by changing the composition of the refrigerant mixture and the return pressure (refrigerant line 20) to the compressor 18. Return pressure to the compressor 18 was generally in a range of approximately 0.1 Mpa to 0.5 Mpa and supply pressure was in a range of approximately 1.5 Mpa to 2.5 Mpa.

In the embodiments described above, a very limited cold cryopumping surface 44 was provided. It should be understood that in alternative embodiments in accordance with the invention, the cold refrigerant that passes through a throttle device 42, which may be a capillary tube, orifice, or an expansion valve, is circulated in a cooling tube that is arrayed in a larger chamber for the purpose of providing a higher water vapor pumping speed. The cooling tube can be extended and brought close to a source of water which is released from a process that is taking place within a vacuum chamber.

The amount of cooling required from the refrigeration system 10 is proportional to the cold pumping surface area, assuming other conditions are the same. For example, a cold surface having a thin layer of water frozen on it, absorbs almost all of the incident room temperature radiation. Thus, in extending the cold surface area by using a distribution of tubings, it must be recognized that the heat load, e.g., on a 120K surface coated with ice in a dirty chamber at room temperature, has been found to be about 450 watts per square meter. Thus, it can be seen that the compressor capacity must be related not only to the water vapor that is expected to freeze but also to the radiant energy that flows to the tubing in view of the extremely low surface temperatures that are produced in the chamber.

In each of the embodiments described above, location of the heat exchanger 36 in a housing 46 immediately adjacent to the vacuum chamber and cold element 44, is a significant advantage that permits the use of room temperature connecting lines between a remote compressor and the cold trap.

As is known, the gases that are frozen on the cold surfaces 44 of the cryopump, must be removed. This is effected by defrosting the cold trap and collecting the water which liquifies and falls from the surfaces.

Figure 9:
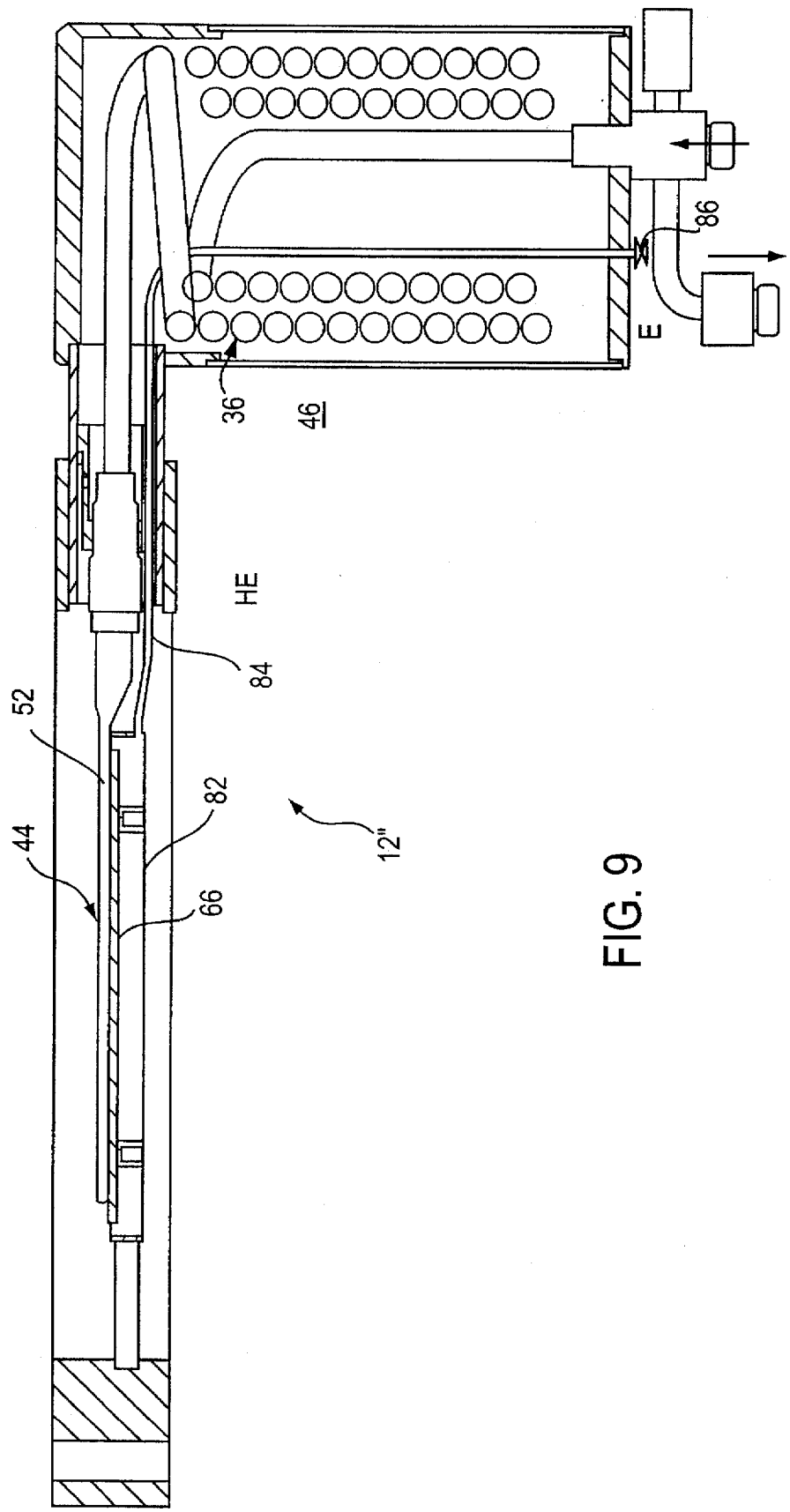
FIG. 9 is a view similar to FIG. 2 of another alternative embodiment in accordance with the invention; having a self draining cryopumping surface construction.

FIG. 9 illustrates another alternative embodiment of a cold trap 12" in accordance with the invention. The construction is similar to that in FIG. 2 except that a water tray 82 is mounted beneath the plate 66 that is connected to the flattened tube 52. A drain tube 84 provides a flow path for liquid water between the tray 82 and a drain valve 86 that is located outside of the closed housing 46 of the heat exchanger 36.

During a defrost cycle of the system 10, the vapor frozen on the surfaces of the cryopump melts and water drips into the tray 82 from which it may be drained by opening the valve 86.

To enhance collection of water from the cryopumping surface during defrost, a slight angle away from the horizontal and toward the drain tube 84 may be provided for the cryopumping surface. The tray may have a base including sloped surfaces that guide the water to the inlet of the drain tube 84. Wicking (not shown) may be used from the underside of the cryopump surface 44 to the inlet of the drain tube 84 to enhance water drainage in alternative embodiments in accordance with the invention.

Whereas the capillary tube 42' was centered in the flattened tubing 52 in FIG. 5, in alternative embodiments other configurations (e.g. FIGS. 13a–c) may be utilized with good effect. Flattening of the tube 52 has the purpose of enhancing heat transfer by raising the velocity of refrigerant flow. In these novel arrangements, the flow restriction 42 also serves as a heat exchange element.

In summary, water vapor pumping from a vacuum chamber is provided over a wide range of thermal loads within a relatively narrow range of cryogenic temperatures, e.g., less than 20K range, by using selected mixed refrigerants in a closed cycle vapor compression system that requires no adjustment in the refrigerant throttle over the desired capacity range. Different refrigerant mixtures accommodate different narrow temperature ranges. Locating the counterflow heat exchanger immediately adjacent to the cryopumping surface and refrigerant throttle device permits use of approximately room temperature refrigerant lines, that require no insulation, between a remote compressor and the heat exchanger.

It will thus be seen that the objects set forth above and those made apparent from the preceding description are efficiently attained, and since certain changes may be made in the above constructions without departing from the spirit and scope of the invention, it is intended that all matter contained in the description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger being located proximate said cryopumping surface and said flow restrictor; and a refrigerant compressor, an aftercooler and flow lines between said compressor and said aftercooler and said heat exchanger to complete a refrigeration cycle, said flow lines being uninsulated, and approximately at ambient temperature when in operation with a mixed refrigerant.

2. A cold trap system for pumping a Group I gas as in claim 1, wherein in operation of said system said heat exchanger high pressure inlet and said heat exchanger low pressure outlet are each approximately at ambient temperature.

3. A cold trap system for pumping a Group I gas as in claim 1, further comprising a refrigerant compressor, an aftercooler and flow lines between said compressor and said aftercooler and said heat exchanger, said flow lines being uninsulated, and approximately at ambient temperature when in operation.

4. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other, said heat exchanger being enclosed in a housing;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger and housing being located proximate said cryopumping surface and said flow restrictor, said heat exchanger housing being mountable outside said vacuum chamber wherein said cryopumping surface is to be exposed, and connection means between said cryogenic pumping surface and said heat exchanger, said connection means during operation communicating a vacuum within said vacuum chamber with an interior space of said heat exchanger housing.

5. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other, said heat exchanger being enclosed in a housing;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger and housing being located proximate said cryopumping surface and said flow restrictor, said heat exchanger housing being mountable outside said vacuum chamber wherein said cryopumping surface is to be exposed, and further comprising connection means between said cryogenic pumping surface and said heat exchanger, said connection means isolating a vacuum within said vacuum chamber during operation from an interior space of said heat exchanger housing.

6. A cold trap system for pumping a Group I gas as in claim 4, wherein said cryogenic pumping surface and said heat exchanger are connected as an integral assembly.

7. A cold trap system for pumping a Group I gas as in claim 5, wherein said cryogenic pumping surface and said heat exchanger are connected as an integral assembly.

8. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other, said heat exchanger being enclosed in a housing;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger and housing being located proximate said cryopumping surface and said flow restrictor, wherein said refrigerant is a selected mixture of components for providing a selected temperature span for said cryopumping surface of approximately 20K within a range of temperatures of approximately 80K to 160K.

9. A cold trap system for pumping a Group I gas as in claim 3, wherein said refrigerant is a selected mixture of components for providing a temperature span of approximately 20K within a range of temperatures of approximately 80K to 160K.

10. A cold trap system for pumping a Group I gas as in claim 9, wherein said selected mixture operates in a range of 1.5 Mpa to 2.5 Mpa compressor discharge and 0.1 Mpa to 0.5 Mpa compressor return.

11. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other, said heat exchanger being enclosed in a housing;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger and housing being located proximate said cryopumping surface and said flow restrictor, said refrigerant flow restrictor includes a capillary tube, said capillary tube being attached to a cold plate, and said cold plate serving as said cryopumping surface when located inside a vacuum chamber.

12. A cold trap system for pumping a Group I gas as in claim 11, wherein said capillary tube extends beyond a periphery of said cold plate and loops back and reattaches to said plate surface.

13. A cold trap system for pumping a Group I gas as in claim 11, further comprising extension means for extending a surface of said cold plate.

14. A cold trap system for pumping a Group I gas, comprising:

a cryopumping surface for exposure inside a vacuum chamber and path means having an inlet and an outlet and thermodynamically connected to said surface for circulating cryogenic refrigerant through said path means and for cooling said surface, in operation, at least one Group I gas freezing on said surface;

a heat exchanger having a high pressure path with an inlet and an outlet, and a low pressure path with an inlet and an outlet, said paths being in heat transfer relationship to each other, said heat exchanger being enclosed in a housing;

a refrigerant flow restrictor connected for refrigerant flow between said outlet of said high pressure path of said heat exchange and said inlet of said path means of said cryopumping surface, the outlet of said path means being connected to said inlet of said low pressure heat exchanger path, said heat exchanger and housing being located proximate said cryopumping surface and said flow restrictor, wherein the Group I gas is water vapor, further comprising a drain pan positioned below at least a portion of said cryopumping surface for catching water melted from said cryopumping surface during a defrost cycle, said drain pan having a drain tube that extends through said heat exchanger housing to ambient environment.

15. A cold trap system as in claim 1, wherein said pumped gas is in a mixture with at least one other gas.

16. A cold trap system as in claim 15, wherein at least one of said at least one other gas is a Group I gas.

17. A cold trap system for pumping a Group I gas as in claim 1, wherein said refrigerant flow restrictor includes a capillary tube, said capillary tube being attached to a cold plate, and said cold plate serving as said cryopumping surface when located inside a vacuum chamber.

18. A cold trap system for pumping a Group I gas as in claim 1, wherein the Group I gas is water vapor, further comprising a drain pan positioned below at least a portion of said cryopumping surface for catching water melted from said cryopumping surface during a defrost cycle, said drain pan having a drain tube that extends to ambient environment.

* * * * *